(12) United States Patent
Lei et al.

(10) Patent No.: US 11,626,140 B2
(45) Date of Patent: Apr. 11, 2023

(54) AUDIO DATA PROCESSING METHOD, ELECTRONIC DEVICE, AND STORAGE MEDIUM

(71) Applicant: Apollo Intelligent Connectivity (Beijing) Technology Co., LTD., Beijing (CN)

(72) Inventors: Xinxue Lei, Beijing (CN); Shubin Liu, Beijing (CN); Wenhuan Zhou, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/449,406

(22) Filed: Sep. 29, 2021

(65) Prior Publication Data

US 2022/0020395 A1 Jan. 20, 2022

(30) Foreign Application Priority Data

Dec. 9, 2020 (CN) .......................... 202011430169.2

(51) Int. Cl.
*G11B 27/031* (2006.01)
*G11B 20/10* (2006.01)
(52) U.S. Cl.
CPC ...... *G11B 27/031* (2013.01); *G11B 20/10527* (2013.01); *G11B 2020/10574* (2013.01); *G11B 2020/10583* (2013.01)
(58) Field of Classification Search
CPC ............ G11B 20/10527; G11B 27/031; G11B 2020/10583; G11B 2020/10574;
(Continued)

(56) References Cited

U.S. PATENT DOCUMENTS

| 2006/0074645 | A1* | 4/2006 | Tischer .................. H04R 27/00 704/226 |
| 2009/0187967 | A1 | 7/2009 | Rostaing et al. |

(Continued)

FOREIGN PATENT DOCUMENTS

| CN | 105451138 A | 3/2016 |
| CN | 105654970 A | 6/2016 |

(Continued)

OTHER PUBLICATIONS

Office Action received for Chinese Patent Application No. 202011430169.2 dated Sep. 7, 2021, 15 pages.

(Continued)

*Primary Examiner* — Thai Q Tran
*Assistant Examiner* — Nienru Yang
(74) *Attorney, Agent, or Firm* — Morrison & Foerster LLP (57) ABSTRACT

An audio data processing method, an electronic device, and a storage medium are provided, which are related to the field of data processing. The method includes: receiving sound production requests respectively sent by a plurality of sound production applications, wherein respective sound production requests include information of ports corresponding to respective sound production applications; acquiring audio data and sound mixing parameters corresponding to the respective sound production applications through the ports corresponding to the respective sound production applications; and mixing respective audio data according to the sound mixing parameters for the respective sound production applications, to generate audio data to be played.

15 Claims, 7 Drawing Sheets

(58) Field of Classification Search
CPC ....... G06F 3/165; H04R 5/04; H04R 2499/13; H04R 2420/01
USPC ........................................................ 386/241
See application file for complete search history.

(56) References Cited

U.S. PATENT DOCUMENTS

| | | | |
|---|---|---|---|
| 2009/0238381 A1* | 9/2009 | Morey | ..................... H04R 5/02 381/119 |
| 2015/0023521 A1 | 1/2015 | Jones et al. | |
| 2015/0146881 A1 | 5/2015 | Malsbary et al. | |
| 2016/0294884 A1 | 10/2016 | Vincent et al. | |
| 2019/0369949 A1 | 12/2019 | Chang | |

FOREIGN PATENT DOCUMENTS

| | | |
|---|---|---|
| CN | 107911361 A | 4/2018 |
| CN | 107967130 A | 4/2018 |
| CN | 108235052 A | 6/2018 |
| CN | 109830248 A | 5/2019 |
| CN | 109996099 A | 7/2019 |
| CN | 111312296 A | 6/2020 |
| CN | 111787462 A | 10/2020 |
| JP | 2006137293 A | 6/2006 |
| JP | 2015012592 A | 1/2015 |

OTHER PUBLICATIONS

Office Action received for Japanese Patent Application No. 2021-115021 dated Sep. 7, 2022, 10 pages.
Extended European Search Report and Opinion received for European Patent Application No. 21206867.0 dated May 11, 2022, 8 pages.
Notice to Grant with Supplementary Search Report received for Chinese Patent Application No. 202011430169.2 dated Feb. 23, 2022, 5 pages.

* cited by examiner

AUDIO DATA PROCESSING METHOD, ELECTRONIC DEVICE, AND STORAGE MEDIUM

CROSS-REFERENCE TO RELATED APPLICATION

This application claims priority to Chinese patent application No. 202011430169.2, filed on Dec. 9, 2020, which is hereby incorporated by reference in its entirety.

TECHNICAL FIELD

The present disclosure relates to the field of data processing, and in particular to an audio data processing method, apparatus, device, and a storage medium.

BACKGROUND

In the existing technology, an audio management system used for the vehicle-mounted side usually uses the scheme of a sound production application requiring an audio focus to play audios. Specifically, the sound production application needs to send an occupation requirement to an audio focus when producing a sound, and plays a corresponding audio in case that the sound production application occupies the audio focus.

SUMMARY

The present disclosure provides an audio data processing method, apparatus, device, and storage medium.

According to an aspect of the present disclosure, an audio data processing method is provided, including:

receiving sound production requests respectively sent by a plurality of sound production applications, wherein respective sound production requests include information of ports corresponding to respective sound production applications;

acquiring audio data and sound mixing parameters corresponding to the respective sound production applications through the ports corresponding to the respective sound production applications; and mixing respective audio data according to the sound mixing parameters for the respective sound production applications, to generate audio data to be played.

According to another aspect of the present disclosure, an audio data processing apparatus is provided, including:

a sound production request reception module configured for receiving sound production requests respectively sent by a plurality of sound production applications, wherein respective sound production requests include information of ports corresponding to respective sound production applications;

an audio data and sound mixing parameter acquisition module configured for acquiring audio data and sound mixing parameters corresponding to the respective sound production applications through the ports corresponding to the respective sound production applications; and an audio data to be played generation module configured for mixing respective audio data according to the sound mixing parameters for the respective sound production applications, to generate audio data to be played.

In a third aspect, an electronic device is provided, including:

at least one processor; and a memory communicatively connected with the at least one processor; wherein, the memory stores instructions executable by the at least one processor, and the instructions are executed by the at least one processor to enable the at least one processor to execute the method provided by any embodiment of the present disclosure.

In a fourth aspect, an embodiment of the present disclosure provides a non-transitory computer-readable storage medium storing computer instructions, wherein the computer instructions are configured for enabling a computer to execute the method provided by any embodiment of the present disclosure.

In a fifth aspect, an embodiment of the present disclosure provides a computer program product, including a computer program; wherein the computer program, when executed by a processor, implements the method provided by any embodiment of the present disclosure.

It should be understood that the content described in this section is not intended to identify the key or important features of the embodiments of the present disclosure, and is not intended to limit the scope of the present disclosure. Other features of the present disclosure will be easily understood through the following description.

BRIEF DESCRIPTION OF THE DRAWINGS

The accompanying drawings are used to better understand the present solution(s) and do not construct a limitation to the present disclosure. In the drawings.

DETAILED DESCRIPTION

The exemplary embodiments of the present disclosure will be described below in combination with the accompanying drawings, including various details of the embodiments of the present disclosure to facilitate understanding, which should be considered as exemplary only. Therefore, those skilled in the art should realize that various changes and modifications can be made to the embodiments described herein without departing from the scope and spirit of the present disclosure. Likewise, descriptions of well-known functions and structures are omitted in the following description for clarity and conciseness.

Figure 1:
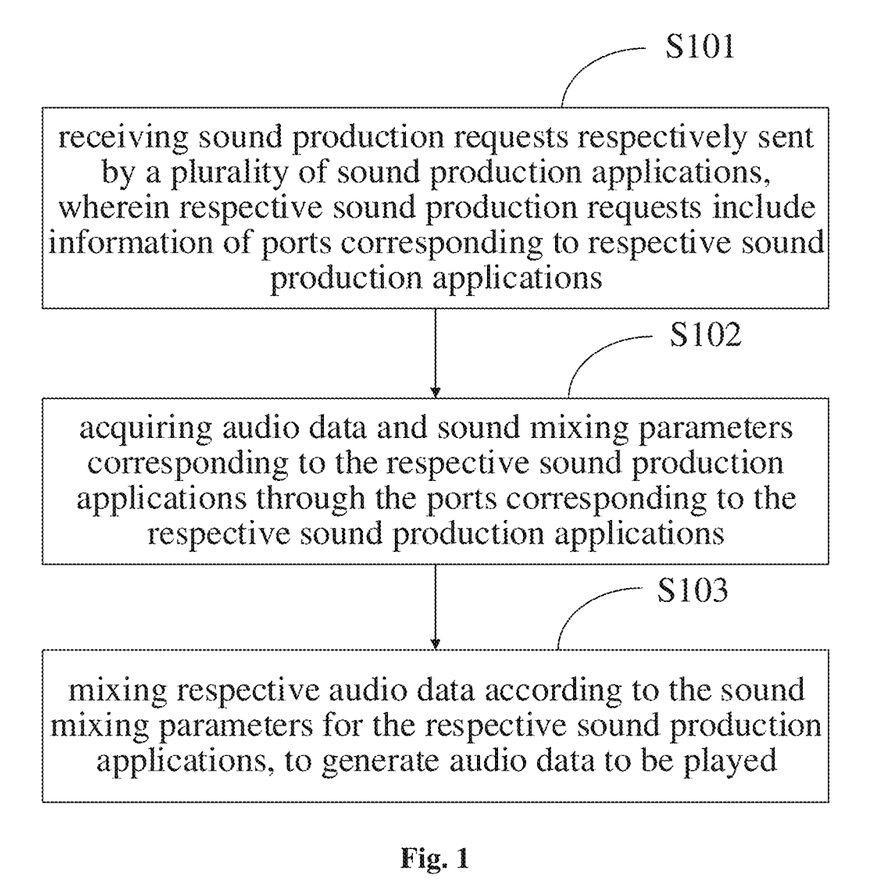
FIG. 1 is a flow chart of an audio data processing method according to the present disclosure.

As shown in FIG. 1, an embodiment of the present disclosure provides an audio data processing method, and the method can include:

S101: receiving sound production requests respectively sent by a plurality of sound production applications, wherein respective sound production requests include information of ports corresponding to respective sound production applications;

S102: acquiring audio data and sound mixing parameters corresponding to the respective sound production applications through the ports corresponding to the respective sound production applications; and S103: mixing respective audio data according to the sound mixing parameters for the respective sound production applications, to generate audio data to be played.

The method of the embodiment of the present disclosure can be applied to an audio management system of a vehicle-mounted side. In particular, by means of the above method, a multimedia system of the vehicle-mounted side can process the audio data for a plurality of sound production applications and send the generated audio data to be played to a loudspeaker. Wherein, the sound production application can be a default application or a third-party application installed in the multimedia system of the vehicle-mounted side. For example, the sound production application can be an FM (Frequency Modulation) radio application, a TTS (Text To Speech) application, a radar alarm application, a music playing application, a telephony application, a map navigation application and other applications related to audio playing.

Illustratively, in S101, the sound production requests respectively sent by the plurality of sound production application can be received by an audio selector. The information of a port corresponding to a sound production application can be a port number of the port corresponding to the sound production application, and the audio selector can call the corresponding port by the port number of the port.

Illustratively, in S102, the audio picker acquires the audio data and the sound mixing parameters corresponding to the sound production applications from a sound pool by calling the ports corresponding to the sound production applications. Wherein, the audio data and the sound mixing parameters corresponding to the sound production applications can be pre-cached in the sound pool before loaded (for example, when installed), so that low-delay loading of the audio data and the sound mixing parameters can be realized.

The port can be an Ethernet port using TCP/IP (Transmission Control Protocol/Internet Protocol). It can be understood by those skilled in the art that TCP/IP refers to a protocol cluster that enables the transmission of information among a plurality of different networks. For example, TCP/IP can include protocols, such as FTP, SMTP, TCP, UDP, IP, etc. Therefore, it can be ensured that the audio data and the sound mixing parameters for the sound production applications can be timely and completely transmitted from the sound pool to the audio selector through the ports corresponding to the sound production applications.

Illustratively, in S103, the audio data and the sound mixing parameters for respective sound production application sent by the audio selector can be received by a sound mixer, the audio data for respective sound production application can be processed according to the sound mixing parameters for respective sound production applications, and the separate audio data to be played can be generated and sent to the loudspeaker after being mixed. Wherein, the audio data to be played can be a mixed audio stream file generated after the respective audio data is processed and mixed.

It should be noted that in the existing technology, an audio management system used for the vehicle-mounted side usually uses the scheme of a sound production application requiring an audio focus to play audios. Specifically, the sound production application needs to send an occupation requirement to an audio focus when producing a sound, and plays a corresponding audio in case that the sound production application occupies the audio focus. In a scene related to the fact that a plurality of sound production applications have sound production demands, problems that an audio focus is preempted, the audio focus, after being occupied, is not released and the like easily occur, resulting in the high frequency of abnormal playing.

According to the audio data processing method of the embodiment of the present disclosure, by receiving the sound production requests sent by the sound production applications, according to the information of the ports, corresponding to the sound production applications, in the sound production requests, the corresponding ports are called to directly acquire the audio data and the sound mixing parameters for the sound production applications, and the audio data is processed and mixed according to the sound mixing parameters to obtain the audio data to be played. Therefore, the audio data and the sound mixing parameter for each sound production application can be timely and completely transmitted through a corresponding port to the sound production application to the sound mixer for processing and mixing, so that the sound production request of each sound production application can be timely responded, the occurrence of the situation of abnormal playing caused by the occupation problem of the audio focus in the existing technology is avoided, and the probability of abnormal audio playing is reduced. In addition, compared with the case that the management solution of the audio focus is relatively complex and excessive fault-tolerant mechanisms need to be provided in the existing technology, in the audio data processing method of the embodiment of the present disclosure, the management solution and the excessive fault-tolerant mechanisms do not need to be provided for the audio focus, simplifying the development complexity of the audio management system of the vehicle-mounted side.

According to the technology of the present disclosure the technical problem of high frequency of abnormal playing caused by the occupation problem of the audio focus in the existing technology is solved, and the probability of abnormal audio playing can be reduced, and the success rate of audio playing is improved. In addition, a management solution and excessive fault-tolerant mechanisms do not need to be provided for an audio focus, simplifying the development complexity of an audio management system of a vehicle-mounted side.

Figure 2:
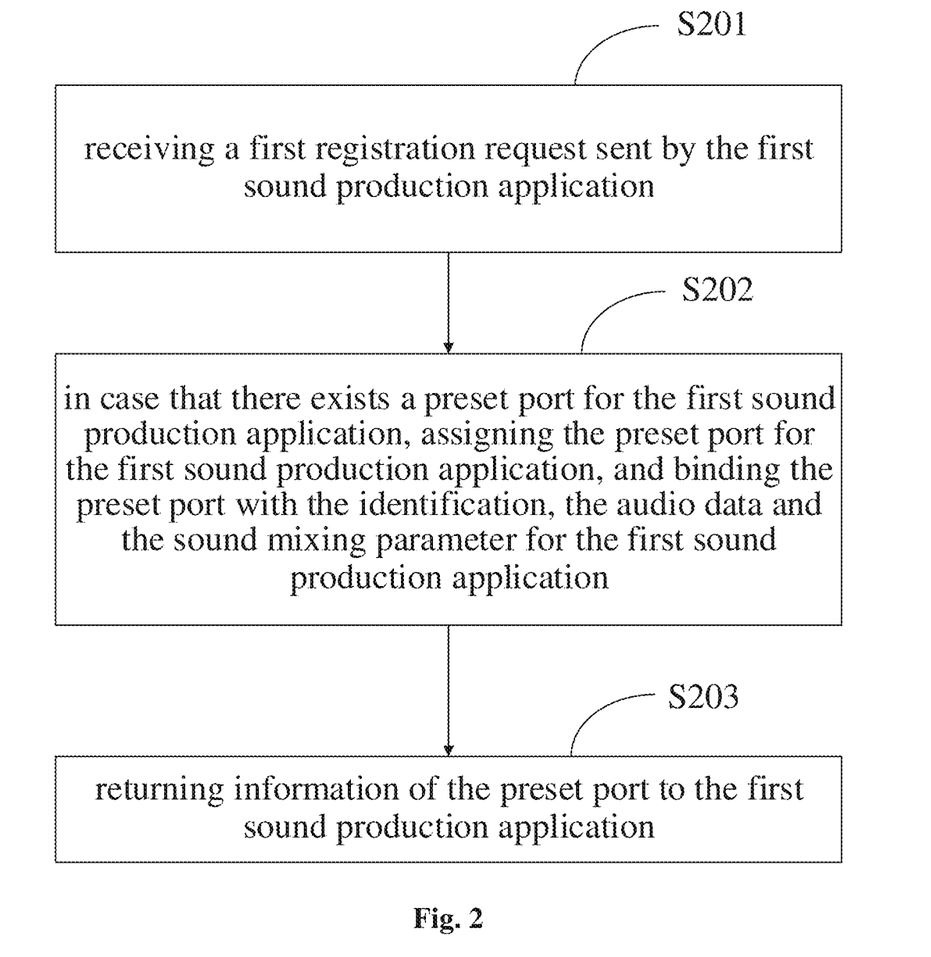
FIG. 2 is a flow chart of registering and binding a port according to the present disclosure.

As shown in FIG. 2, in an implementation, the plurality of sound production applications include a first sound production application, and before S101, the method further includes:

S201: receiving a first registration request sent by the first sound production application, wherein the first registration request includes an identification, audio data and a sound mixing parameter for the first sound production application;

S202: in case that there exists a preset port for the first sound production application, assigning the preset port for the first sound production application, and binding the preset port with the identification, the audio data and the sound mixing parameter for the first sound production application; and S203: returning information of the preset port to the first sound production application.

Illustratively, in S201, the first registration request sent by the first sound production application can be received by the sound pool. The first sound production application can be understood as a sound production application that is currently sending the first registration request. Wherein, there can be a plurality of first sound production applications, and the sound pool can simultaneously receive the first registration requests sent by the plurality of first sound production applications. After the sound pool receives the identification, the audio data and the sound mixing parameter sent by the first sound production application, the sound pool caches the identification, the audio data and the sound mixing parameter sent by the first sound production application in the form of data packets into the sound pool. Wherein, the identification for the sound production application can be understood as an ID representing the sound production application, and the sound pool can identify the corresponding sound production application sending the identification according to the identification.

In S202, whether there exists a preset port for the first sound production application can be determined according to the identification for the first sound production application. The corresponding relationship between the first sound production application and the preset port can be predetermined, i.e. the preset port only is registered and assigned to the first sound production application predetermined for the preset port, but cannot be registered and be assigned to other sound production applications. Wherein, the first sound production application can be a default application pre-installed at the vehicle-mounted side. For example, the first sound production application can be a telephony application, there is a predetermined first preset port for the telephony application, and the telephony application is registered and assigned to the predetermined first preset port when the first registration request sent by the telephony application is received. For another example, the first sound production application can also be a map navigation application; when there is a predetermined second preset port for the map navigation application, and when the first registration request sent by the map navigation application is received, the map navigation application is registered and assigned to the predetermined second preset port.

In S203, after receiving the information of the preset port returned by the sound pool, the first sound production application stores the information of the preset port, to send the information of the preset port corresponding to the first sound production application to the audio selector when the first sound production application sends a sound production request. Wherein, the information of the preset port can include a port number of the preset port.

Through the above solution, the first sound production application can be directly assigned and registered to the corresponding preset port according to the preset corresponding relationship between the first sound production application and the preset port. Moreover, for each first sound production application that there is a preset port for the first sound production application, the sound mixing parameter corresponding to the first sound production application can be uniformly set, and is cached in the sound pool and bound with the preset port. Therefore, general sound mixing parameters corresponding to the respective preset ports are adopted, without needing to independently edit the corresponding sound mixing parameters to be independently edited in the development processes of the respective first sound production applications, so that the corresponding sound mixing parameters for the respective first sound production applications are unified, and the development difficulties of the respective first sound production applications are reduced.

Figure 3:
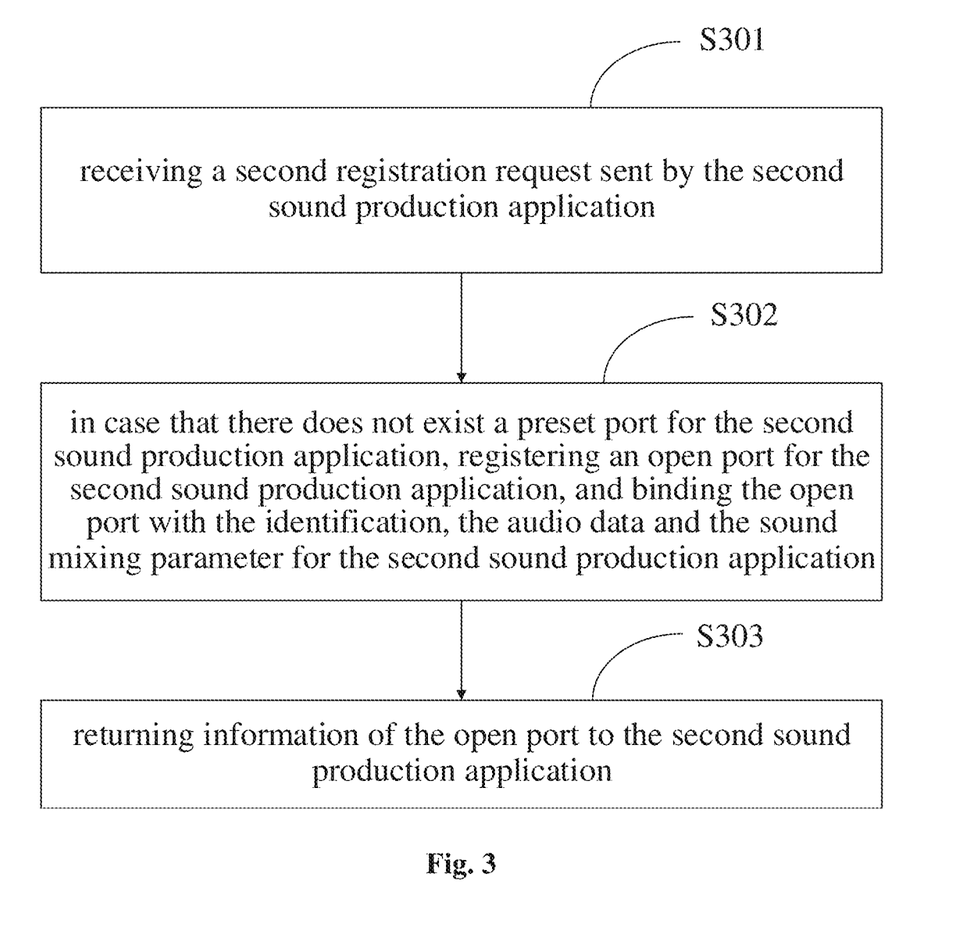
FIG. 3 is a flow chart of registering a port according to the present disclosure.

As shown in FIG. 3, in an implementation, the plurality of sound production applications include a second sound production application, and before S201, the method further includes:

S301: receiving a second registration request sent by the second sound production application, wherein the second registration request includes an identification, audio data and a sound mixing parameter for the second sound production application;

S302: in case that there does not exist a preset port for the second sound production application, registering an open port for the second sound production application, and binding the open port with the identification, the audio data and the sound mixing parameter for the second sound production application; and S303: returning information of the open port to the second sound production application.

Illustratively, in S301, the second registration request sent by the second sound production application can be received by the sound pool. There can be a plurality of second sound production applications, and the sound pool can simultaneously receive the second registration requests sent by the plurality of second sound production applications.

In S302, whether there does not exist a preset port for the second sound production application can be determined according to the identification for the second sound production application. When there does not exist a preset port for the second sound production application, an open port can be sequentially selected according to the ascending order of port numbers of a plurality of open ports, and the open port is registered and assigned to the second sound production application. Wherein, the second sound production application can be a third-party application that is subsequently downloaded and installed at the vehicle-mounted side.

In the above solution, by assigning and binding the open port to the second sound production application which is provided with the preset port, the audio playing demand of the third-party application can be met, and the adaptation range is wide, so that the compatibility of the vehicle-mounted side to the third-party application can be improved, and the use demands of users to various third-party applications can be met.

Figure 4:
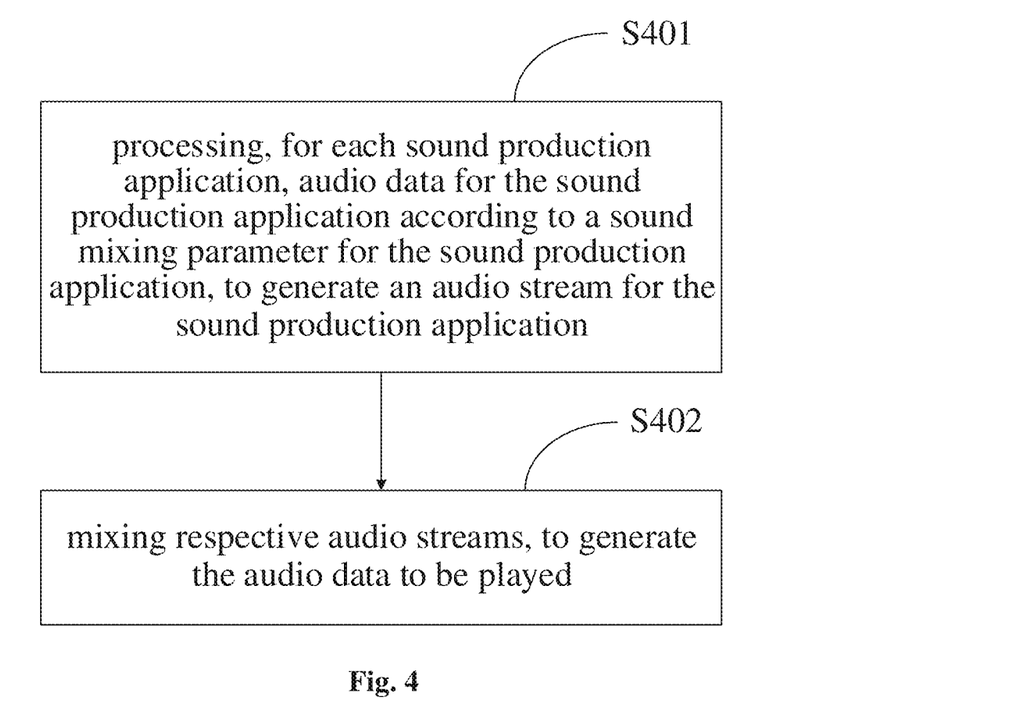
FIG. 4 is a flow chart for generating audio data to be played according to the present disclosure.

As shown in FIG. 4, in an implementation, S103 can include:

S401: processing, for each sound production application, audio data for the sound production application according to a sound mixing parameter for the sound production application, to generate an audio stream for the sound production application; and S402: mixing respective audio streams, to generate the audio data to be played.

Illustratively, the audio data for each sound production application can include a plurality of audio files, the sound mixer performs coding and decoding and format conversion on the plurality of audio files in the audio data according to the sound mixing parameter for each sound production application, to obtain unified audio stream data, then mixes the audio stream data for the plurality of sound production applications to finally obtain composited audio stream data with aligned time stamps, and uses the composited audio stream data as the audio data to be played to be transmitted to the loudspeaker.

In an implementation, the sound mixing parameter includes at least one of a sound production type, a binding duration, a volume factor, and an accompanying parameter.

Illustratively, sound production types can include an exclusive type, a coexistence type, and a time-limited type.

The exclusive type means that only the audio source of the sound production application is independently played within the preset playing duration of the sound production application. For example, the sound production application whose sound production type is the exclusive type can be a telephony application. Further, the exclusive type can be divided into a long-term exclusive type and a short-term exclusive type according to the preset playing duration of the sound production application. The coexistence type means that it can be simultaneously played with the audio sources of other sound production applications within the preset playing duration of the sound production application. For example, the sound production application whose sound production type is the coexistence type can be a music playing application or a map navigation application.

The binding duration refers to the duration that the sound production application is registered and bound to the corresponding port. Wherein, the binding durations of the sound production applications whose sound production types are a long-term exclusive type and a coexistence type are infinite, that is, the sound production applications whose sound production types are the long-term exclusive type and the coexistence type are always bound to the corresponding ports thereof. The binding duration of the sound production application whose sound production type is a time-limited type is a preset value, and the binding relationship with the corresponding port is canceled when an interval after the registration and binding reaches the binding duration.

The volume factor refers to the ratio of a volume of an audio source of the sound production application when played to a maximum playing volume of a loudspeaker, and the value range of the volume factor can be 0-1, wherein 0 represents silence, and 1 represents the maximum volume.

The accompanying parameters can include a sound track playing mode, and in particular, the sound track playing mode can include mono, dual track, and stereo.

Therefore, the audio data for a plurality of sound production applications are processed and mixed according to the sound mixing parameters, and the audio data to be played, which integrates a plurality of factors including sound production types, binding durations, volume factors and accompanying parameters, can be obtained, so that the sound mixing effect of the audio source of each sound production application is improved.

Figure 5:
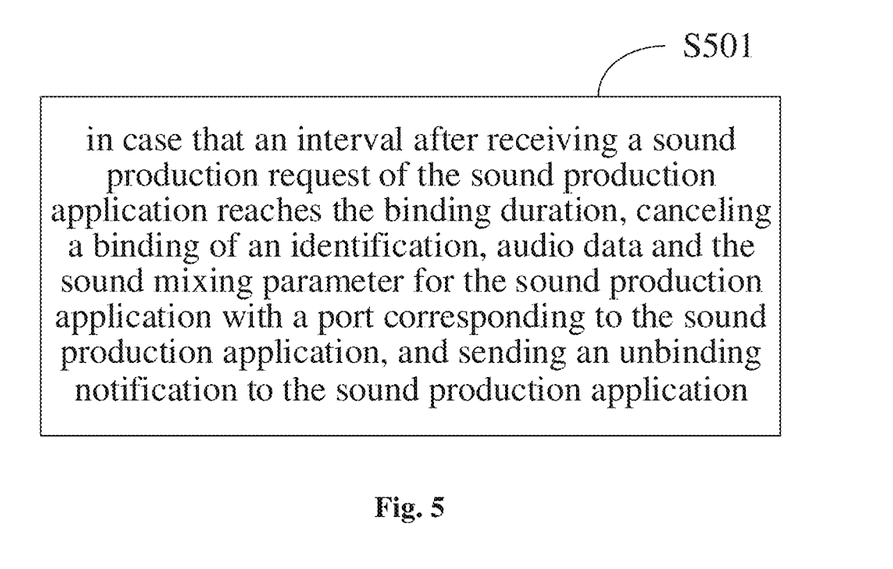
FIG. 5 is a flow chart for canceling port binding according to the present disclosure.

As shown in FIG. 5, in an implementation, after S103, the method can further include:

S501: in case that an interval after receiving a sound production request of the sound production application reaches the binding duration, canceling a binding of an identification, audio data and the sound mixing parameter for the sound production application with a port corresponding to the sound production application, and sending an unbinding notification to the sound production application.

In an example, in the case that the interval after receiving a sound production request of a certain sound production application A reaches the binding duration, the sound production application A sends an unbinding request to the sound pool and deletes the information of the previously registered port. The sound pool cancels the binding of the identification, the audio data and the sound mixing parameter for the sound production application A to the corresponding port according to the unbinding request.

In another example, in the case that the interval after receiving a sound production request of a certain sound production application B reaches the binding duration, the sound pool actively cancels the binding of the identification, the audio data and the sound mixing parameter for the sound production application B to the corresponding port, and sends a unbinding notification to the sound production application B. The sound production application B deletes the information of the previously registered port after receiving the unbinding notification.

It can be understood that after the binding of the identification, the audio data and sound mixing parameter for a certain sound production application to the corresponding port is canceled, the previously bound port of the certain sound production application is reset, so that the port is released and in an idle state.

Through the above solution, the binding relationship between the sound production application and the port can be canceled in time according to the preset binding duration, so that the port is reset and released in time, preventing the port from being occupied for a long time.

An example of an application scenario according to the present disclosure is described below with reference to FIG. 8.

Figure 8:
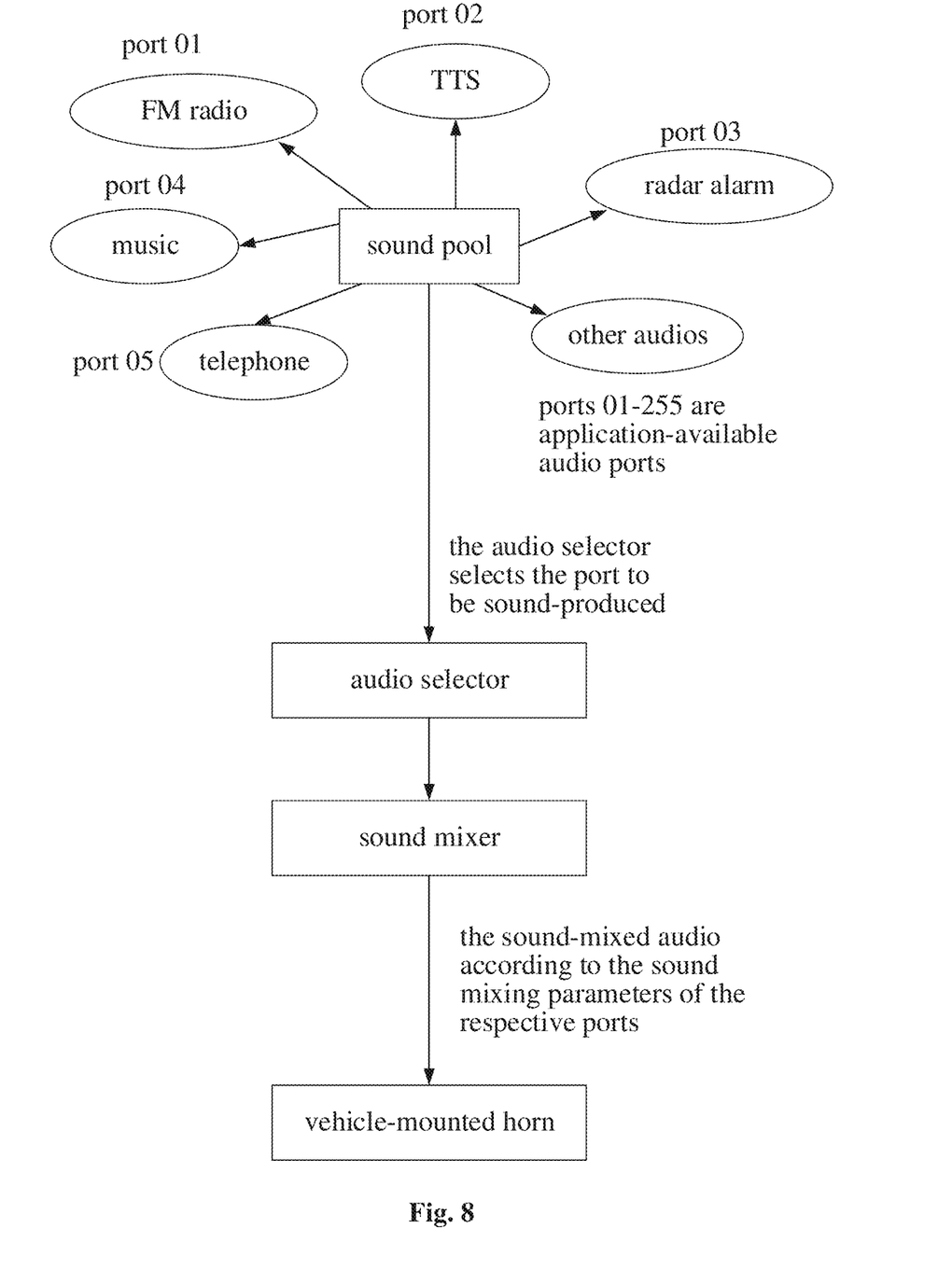
FIG. 8 is a scene diagram of an audio data processing method for implementing an embodiment of the present disclosure.

As shown in FIG. 8, the sound pool receives registration requests sent by the respective sound production applications. The sound pool respectively assigns corresponding ports for the respective sound production applications according to the respective registration requests, binds the assigned ports to the identifications, the audio data and the sound mixing parameters for the sound production applications, and then returns information of the assigned ports to the sound production applications. Wherein, the port number of the plurality of ports can be 01-255. Ports 01-05 are preset ports for binding the preset sound production applications. For example, the port 01 can be registered and bound to an FM radio application, the port 02 can be registered and bound to a TTS application, the port 03 can be registered and bound to a music playing application, the port 04 can be registered and bound to a telephony application, and the port 05 can be registered and bound to a map navigation application. Ports 06-225 are open ports for registration and binding of the other applications involving the audio playing.

The audio selector receives sound production requests respectively sent by a plurality of sound production applications, wherein respective sound production requests include information of ports corresponding to respective sound production applications. The audio selector calls a corresponding port according to the information of each port, obtains the audio data and the sound mixing parameter for the sound production application through the corresponding port, and transmits the audio data and the sound mixing parameter for the sound production application to the sound mixer.

The sound mixer processes the audio data for the respective sound production applications according to the sound mixing parameters for the respective sound production applications to generate audio streams for the respective sound production applications, and then mixes the audio streams for the respective sound production applications to generate the audio data to be played. A vehicle-mounted horn plays the audio sources of the respective sound production applications according to the audio data to be played.

Figure 6:
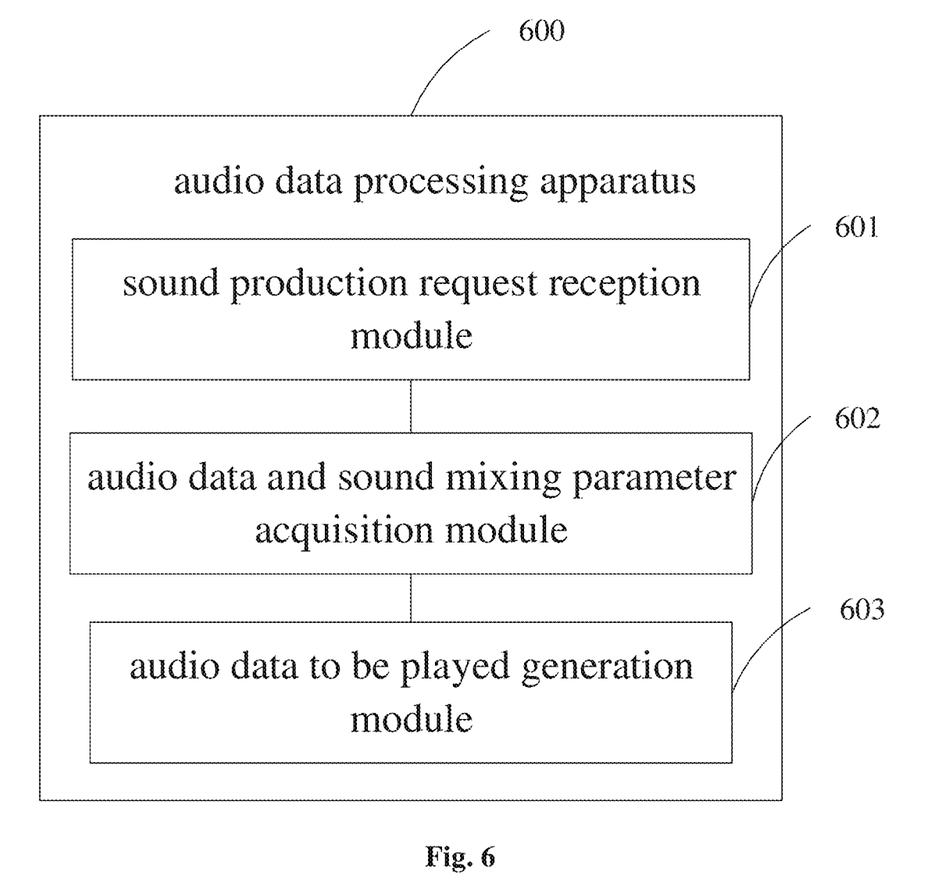
FIG. 6 is a flow chart of an audio data processing apparatus according to the present disclosure.

As shown in FIG. 6, the present disclosure also provides an audio data processing apparatus 600, which can include the following assemblies:

a sound production request reception module 601 configured for receiving sound production requests respectively sent by a plurality of sound production applications, wherein respective sound production requests include information of ports corresponding to respective sound production applications;

an audio data and sound mixing parameter acquisition module 602 configured for acquiring audio data and sound mixing parameters corresponding to the respective sound production applications through the ports corresponding to the respective sound production applications; and an audio data to be played generation module 603 configured for mixing respective audio data according to the sound mixing parameters for the respective sound production applications, to generate audio data to be played.

In an implementation, the plurality of sound production applications include a first sound production application, and the apparatus 600 further includes:

a first registration request reception module configured for receiving a first registration request sent by the first sound production application, wherein the first registration request includes an identification, audio data and a sound mixing parameter for the first sound production application;

a preset port binding module configured for, in case that there exists a preset port for the first sound production application, assigning the preset port for the first sound production application, and binding the preset port with the identification, the audio data and the sound mixing parameter for the first sound production application; and a preset port information return module configured for returning information of the preset port to the first sound production application.

In an implementation, the plurality of sound production applications further include a second sound production application, and the apparatus 600 further includes:

receiving a second registration request sent by the second sound production application, wherein the second registration request includes an identification, audio data and a sound mixing parameter for the second sound production application;

in case that there does not exist a preset port for the second sound production application, registering an open port for the second sound production application, and binding the open port with the identification, the audio data and the sound mixing parameter for the second sound production application; and returning information of the open port to the second sound production application.

In an implementation, the audio data to be played generation module 603 further includes:

an audio stream generation unit configured for processing, for each sound production application, audio data for the sound production application according to a sound mixing parameter for the sound production application, to generate an audio stream for the sound production application; and an audio data to be played generation unit configured for mixing respective audio streams, to generate the audio data to be played.

In an implementation, the sound mixing parameter includes at least one of a sound production type, a binding duration, a volume factor, and an accompanying parameter.

In an implementation, the apparatus 600 further includes:

an unbinding module configured for, in case that an interval after receiving a sound production request of the sound production application reaches the binding duration, canceling a binding of an identification, audio data and the sound mixing parameter for the sound production application with a port corresponding to the sound production application, and sending an unbinding notification to the sound production application.

According to embodiments of the present disclosure, the present disclosure also provides an electronic device, a readable storage medium and a computer program product.

Figure 7:
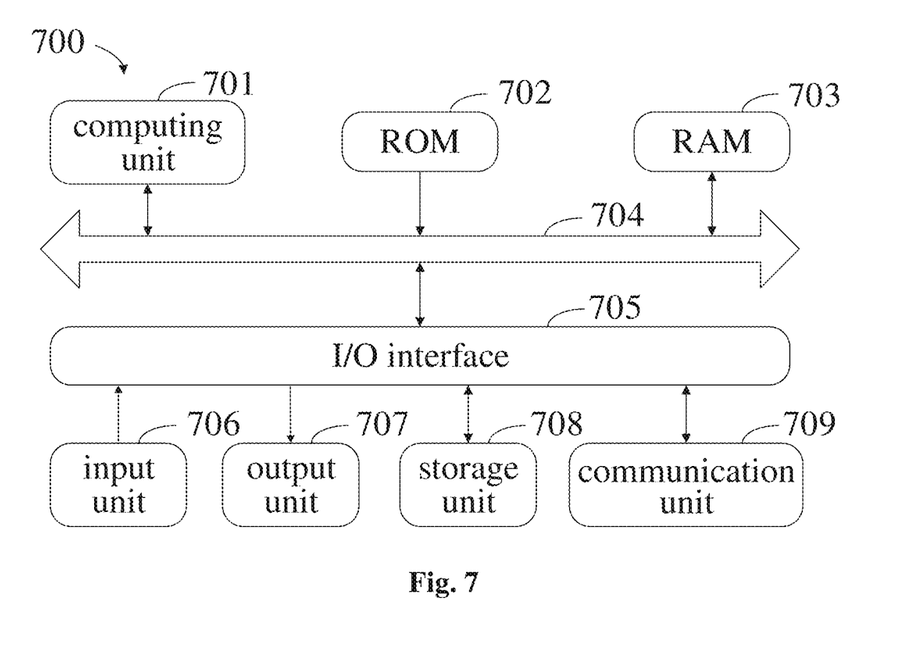
FIG. 7 is a block diagram of an electronic device configured for implementing the audio data processing method according to an embodiment of the present disclosure.

FIG. 7 illustrates a schematic block diagram of an exemplary electronic device 700 that can be used to implement embodiments of the present disclosure. The electronic device is intended to represent various forms of digital computers, such as laptop computers, desktop computers, workstations, personal digital assistants, servers, blade servers, mainframe computers, and other suitable computers. The electronic device can also represent various forms of mobile apparatuses, such as personal digital processing, cellular telephone, smart phone, wearable device, and other similar computing apparatuses. The parts, connections and relationships thereof, and functions thereof shown herein are merely examples and are not intended to limit the implementation of the present disclosure described and/or claimed herein.

As shown in FIG. 7, the device 700 includes a computing unit 701 that can perform various suitable actions and processes in accordance with a computer program stored in a read only memory (ROM) 702 or a computer program loaded from a storage unit 708 into a random access memory (RAM) 703. In the RAM 703, various programs and data required for the operation of the storage device 700 can also be stored. The computing unit 701, the ROM 702 and the RAM 703 are connected to each other through a bus 704. An input/output (I/O) interface 705 is also connected to the bus 704.

A plurality of components in the device 700 are connected to the I/O interface 705, including an input unit 706, such as a keyboard, a mouse, etc.; an output unit 707, such as various types of displays, loudspeakers, etc.; a storage unit 708, such as a magnetic disk, an optical disk, etc.; and a communication unit 709, such as a network card, a modem, a wireless communication transceiver, etc. The communication unit 709 allows the device 700 to exchange information/data with other devices over a computer network, such as the Internet, and/or various telecommunication networks.

The computing unit 701 can be various general purpose and/or special purpose processing assemblies having processing and computing capabilities. Some examples of the computing unit 701 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 701 performs various methods and processes described above, such as an audio data processing method. For example, in some embodiments, the audio data processing method can be implemented as a computer software program tangibly contained in a machine-readable medium, such as the storage unit 708. In some embodiments, some or all of the computer programs can be loaded into and/or installed on the device 700 via the ROM 702 and/or communication unit 709. When the computer program is loaded into the RAM 703 and executed by the computing unit 701, one or more steps of the audio data processing method described above can be performed. Alternatively, in other embodiments, the computing unit 701 can be configured for performing the audio data processing method by any other suitable means (e.g., via the firmware).

Various implementations of the systems and techniques described herein above can be implemented in a digital electronic circuit system, an integrated circuit system, a field programmable gate array (FPGA), an application specific integrated circuit (ASIC), an application specific standard product (ASSP), a system on a chip (SOC), a complex programmable logic device (CPLD), computer hardware, firmware, software, and/or combinations thereof. These various implementations can include: implementing in one or more computer programs, which can be executed and/or interpreted on a programmable system including at least one programmable processor. The programmable processor can be a dedicated or general-purpose programmable processor that can receive data and instructions from a storage system, at least one input device, and at least one output device, and transmit the data and instructions to the storage system, the at least one input device, and the at least one output device.

Program codes for implementing the methods of the present disclosure can be written in any combination of one or more programming languages. These program codes can be provided to processors or controllers of general purpose computers, special purpose computers, or other programmable data processing apparatuses, such that the program codes, when executed by the processors or the controllers, cause the functions/operations specified in the flowchart(s) and/or block diagram(s) to be implemented. The program codes can execute entirely on a machine, partly on a machine, partly on a machine as a stand-alone software package and partly on a remote machine or entirely on a remote machine or a server.

In the context of the present disclosure, a machine-readable medium can be a tangible medium that can contain or store a program for use by an instruction execution system, apparatus, or device or in connection with the instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination thereof. More specific examples of a machine-readable storage medium can include one or more wires-based electrical connections, a portable computer diskette, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

In order to provide the interaction with a user, the system and technology described herein can be implemented on a computer that has: a display apparatus (e.g., a CRT (cathode ray tube) or an LCD (liquid crystal display) monitor) for displaying information to the user; and a keyboard and a pointing apparatus (e.g., a mouse or a trackball) through which the user can provide input to the computer. Other types of apparatus can also be used to provide the interaction with a user: for example, the feedback provided to the user can be any form of sensory feedback (e.g., visual feedback, auditory feedback, or tactile feedback); and input from the user can be received in any form (including acoustic input, voice input, or tactile input).

The system and technology described herein can be implemented in a computing system (e.g., as a data server) that includes a background part, or be implemented in a computing system (e.g., an application server) that includes a middleware part, or be implemented in a computing system (e.g., a user computer having a graphical user interface or a web browser, through which a user can interact with implementations of the system and technology described herein) that includes a front-end part, or be implemented in a computing system that includes any combination of such background part, middleware part, or front-end part. The parts of the system can be interconnected by any form or medium of the digital data communication (e.g., a communication network). Examples of the communication network include: a Local Area Networks (LAN), a Wide Area Network (WAN), and the Internet.

A computer system can include a client and a server. The client and server are typically remote from each other and typically interact through a communication network. The relationship of the client and the server is generated by computer programs running on respective computers and having a client-server relationship with each other.

According to the technical solutions of the embodiments of the present disclosure, the audio data and the sound mixing parameter for each sound production application can be timely and completely transmitted by a port corresponding to the sound production application to the sound mixer for processing and mixing, so that the sound production request of each sound production application can be timely responded, the occurrence of the situation of abnormal playing caused by the occupation problem of the audio focus in the existing technology is avoided, and the probability of abnormal audio playing is reduced. In addition, compared with the case that the management solution of the audio focus is relatively complex and excessive fault-tolerant mechanisms need to be provided in the existing technology, in the audio data processing method of the embodiment of the present disclosure, the management solution and the excessive fault-tolerant mechanisms do not need to be provided for the audio focus, simplifying the development complexity of the audio management system of the vehicle-mounted side.

It should be understood that various forms of processes shown above can be used to reorder, add, or delete steps. For example, respective steps recorded in the present disclosure can be executed in parallel, or can be executed sequentially, or can be executed in a different order, so long as the desired result of the technical solution provided in the present disclosure can be achieved, no limitation is made herein.

The above-mentioned specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement, and the like made within the spirit and principle of the present disclosure shall be included within the protection scope of the present disclosure.

What is claimed is:

1. An audio data processing method, comprising:
   receiving sound production requests respectively sent by a plurality of sound production applications, wherein respective sound production requests comprise information of ports corresponding to respective sound production applications;
   acquiring audio data and sound mixing parameters corresponding to the respective sound production applications through the ports corresponding to the respective sound production applications; and
   mixing respective audio data according to the sound mixing parameters for the respective sound production applications, to generate audio data to be played,
   wherein the plurality of sound production applications comprise a first sound production application, and before receiving the sound production requests respectively sent by the plurality of sound production applications, the method further comprises:
receiving a first registration request sent by the first sound production application, wherein the first registration request comprises an identification, audio data and a sound mixing parameter for the first sound production application;
in case that there exists a preset port for the first sound production application, assigning the preset port for the first sound production application, and binding the preset port with the identification, the audio data and the sound mixing parameter for the first sound production application; and
returning information of the preset port to the first sound production application.

2. The method of claim 1, wherein the plurality of sound production applications comprise a second sound production application, and before receiving the sound production requests respectively sent by the plurality of sound production applications, the method further comprises:
receiving a second registration request sent by the second sound production application, wherein the second registration request comprises an identification, audio data and a sound mixing parameter for the second sound production application;
in case that there does not exist a preset port for the second sound production application, registering an open port for the second sound production application, and binding the open port with the identification, the audio data and the sound mixing parameter for the second sound production application; and
returning information of the open port to the second sound production application.

3. The method of claim 1, wherein mixing the respective audio data according to the sound mixing parameters for the respective sound production applications, to generate the audio data to be played, comprises:
processing, for each sound production application, audio data for the sound production application according to a sound mixing parameter for the sound production application, to generate an audio stream for the sound production application; and
mixing respective audio streams, to generate the audio data to be played.

4. The method of claim 3, wherein the sound mixing parameter comprises at least one of a sound production type, a binding duration, a volume factor, and an accompanying parameter.

5. The method of claim 4, wherein after generating the audio data to be played, the method further comprises:
in case that an interval after receiving a sound production request of the sound production application reaches the binding duration, canceling a binding of an identification, audio data and the sound mixing parameter for the sound production application with a port corresponding to the sound production application, and sending an unbinding notification to the sound production application.

6. An electronic device, comprising:
at least one processor; and
a memory communicatively connected with the at least one processor; wherein
the memory stores instructions executable by the at least one processor, and the instructions are executed by the at least one processor to enable the at least one processor to perform operations of:
receiving sound production requests respectively sent by a plurality of sound production applications, wherein respective sound production requests comprise information of ports corresponding to respective sound production applications;
acquiring audio data and sound mixing parameters corresponding to the respective sound production applications through the ports corresponding to the respective sound production applications; and
mixing respective audio data according to the sound mixing parameters for the respective sound production applications, to generate audio data to be played,
wherein the plurality of sound production applications comprise a first sound production application, and before receiving the sound production requests respectively sent by the plurality of sound production applications, the instructions are executed by the at least one processor to enable the at least one processor to further perform operations of:
receiving a first registration request sent by the first sound production application, wherein the first registration request comprises an identification, audio data and a sound mixing parameter for the first sound production application;
in case that there exists a preset port for the first sound production application, assigning the preset port for the first sound production application, and binding the preset port with the identification, the audio data and the sound mixing parameter for the first sound production application; and
returning information of the preset port to the first sound production application.

7. The electronic device of claim 6, the plurality of sound production applications comprise a second sound production application, and before receiving the sound production requests respectively sent by the plurality of sound production applications, the instructions are executed by the at least one processor to enable the at least one processor to further perform operations of:
receiving a second registration request sent by the second sound production application, wherein the second registration request comprises an identification, audio data and a sound mixing parameter for the second sound production application;
in case that there does not exist a preset port for the second sound production application, registering an open port for the second sound production application, and binding the open port with the identification, the audio data and the sound mixing parameter for the second sound production application; and
returning information of the open port to the second sound production application.

8. The electronic device of claim 6, wherein mixing the respective audio data according to the sound mixing parameters for the respective sound production applications, to generate the audio data to be played, comprises:
processing, for each sound production application, audio data for the sound production application according to a sound mixing parameter for the sound production application, to generate an audio stream for the sound production application; and
mixing respective audio streams, to generate the audio data to be played.

9. The electronic device of claim 8, wherein the sound mixing parameter comprises at least one of a sound production type, a binding duration, a volume factor, and an accompanying parameter.

10. The electronic device of claim 9, wherein after generating the audio data to be played, the instructions are executed by the at least one processor to enable the at least one processor to further perform an operation of:
- in case that an interval after receiving a sound production request of the sound production application reaches the binding duration, canceling a binding of an identification, audio data and the sound mixing parameter for the sound production application with a port corresponding to the sound production application, and sending an unbinding notification to the sound production application.

11. A non-transitory computer-readable storage medium storing computer instructions, wherein the computer instructions are configured for enabling a computer to perform operations of:
- receiving sound production requests respectively sent by a plurality of sound production applications, wherein respective sound production requests comprise information of ports corresponding to respective sound production applications;
- acquiring audio data and sound mixing parameters corresponding to the respective sound production applications through the ports corresponding to the respective sound production applications; and
- mixing respective audio data according to the sound mixing parameters for the respective sound production applications, to generate audio data to be played,
- wherein the plurality of sound production applications comprise a first sound production application, and before receiving the sound production requests respectively sent by the plurality of sound production applications, the computer instructions are configured for enabling the computer to perform further operations of:
- receiving a first registration request sent by the first sound production application, wherein the first registration request comprises an identification, audio data and a sound mixing parameter for the first sound production application;
- in case that there exists a preset port for the first sound production application, assigning the preset port for the first sound production application, and binding the preset port with the identification, the audio data and the sound mixing parameter for the first sound production application; and
- returning information of the preset port to the first sound production application.

12. The non-transitory computer-readable storage medium of claim 11, wherein the plurality of sound production applications comprise a second sound production application, and before receiving the sound production requests respectively sent by the plurality of sound production applications, the computer instructions are configured for enabling the computer to perform further operations of:
- receiving a second registration request sent by the second sound production application, wherein the second registration request comprises an identification, audio data and a sound mixing parameter for the second sound production application;
- in case that there does not exist a preset port for the second sound production application, registering an open port for the second sound production application, and binding the open port with the identification, the audio data and the sound mixing parameter for the second sound production application; and
- returning information of the open port to the second sound production application.

13. The non-transitory computer-readable storage medium of claim 11, wherein mixing the respective audio data according to the sound mixing parameters for the respective sound production applications, to generate the audio data to be played, comprises:
- processing, for each sound production application, audio data for the sound production application according to a sound mixing parameter for the sound production application, to generate an audio stream for the sound production application; and
- mixing respective audio streams, to generate the audio data to be played.

14. The non-transitory computer-readable storage medium of claim 13, wherein the sound mixing parameter comprises at least one of a sound production type, a binding duration, a volume factor, and an accompanying parameter.

15. The non-transitory computer-readable storage medium of claim 14, wherein after generating the audio data to be played, the computer instructions are configured for enabling the computer to perform further an operation of:
- in case that an interval after receiving a sound production request of the sound production application reaches the binding duration, canceling a binding of an identification, audio data and the sound mixing parameter for the sound production application with a port corresponding to the sound production application, and sending an unbinding notification to the sound production application.

* * * * *